(12) United States Patent
Senarath et al.

(10) Patent No.: US 10,321,361 B2
(45) Date of Patent: Jun. 11, 2019

(54) METHOD AND DEVICE FOR REQUESTING A QUALITY OF EXPERIENCE IN A COMMUNICATIONS NETWORK (71) Applicants: Nimal Gamini Senarath, Ottawa (CA); Ngoc-Dung Dao, Ottawa (CA)

(72) Inventors: Nimal Gamini Senarath, Ottawa (CA); Ngoc-Dung Dao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 211 days.

(21) Appl. No.: 14/878,700

(22) Filed: Oct. 8, 2015

(65) Prior Publication Data

US 2016/0105821 A1  Apr. 14, 2016

Related U.S. Application Data (60) Provisional application No. 62/062,654, filed on Oct. 10, 2014.

(51) Int. Cl.
*H04W 4/00* (2018.01)
*H04W 28/24* (2009.01)
(Continued)

(52) U.S. Cl.
CPC ............. *H04W 28/24* (2013.01); *H04W 4/00* (2013.01); *H04W 72/087* (2013.01);
(Continued)

(58) Field of Classification Search
CPC .......................... H04L 41/5035; H04L 47/805
See application file for complete search history.

(56) References Cited

U.S. PATENT DOCUMENTS

| 8,280,994 B2 | 10/2012 | Blouin | |
| 2005/0030952 A1* | 2/2005 | Elmasry | H04L 43/0829 370/395.2 |

(Continued)

FOREIGN PATENT DOCUMENTS

| CN | 101237687 A | 8/2008 |
| CN | 103117905 A | 5/2013 |
| CN | 103348730 A | 10/2013 |

OTHER PUBLICATIONS

PCT International Search Report and Written Opinion, PCT/CN2015/091582, dated Jan. 6, 2016, 11 pages.
(Continued)

*Primary Examiner* — Edan Orgad
*Assistant Examiner* — Emmanuel Maglo (57) ABSTRACT

Systems, devices and methods are provided for incorporating a quality of experience (QoE) assessment into requests or negotiations for a particular quality of service (QoS) for an application in a communications network. A network may provide service in accordance with a particular set of QoS parameters in order to meet a user's requested QoE. A user may select a particular QoE for an application depending on costs associated with the corresponding sets of QoS parameters available from the network. Functionality to determine the correlation between a user's QoE and sets of QoS parameters may be implemented primarily in a user's electronic communications device, primarily in a network device, or in both of these devices. A separate device may be used for determining the QoE and corresponding sets of QoS parameters for various services or applications.

22 Claims, 8 Drawing Sheets (51) Int. Cl.
*H04W 72/08* (2009.01)
*H04W 76/00* (2018.01)
*H04W 28/06* (2009.01)
*H04W 4/08* (2009.01)

(52) U.S. Cl.
CPC .............. *H04W 76/00* (2013.01); *H04W 4/08* (2013.01); *H04W 28/06* (2013.01)

(56) References Cited

U.S. PATENT DOCUMENTS

| | | | | |
|---|---|---|---|---|
| 2005/0220147 A1* | 10/2005 | Pekonen | .................... | H04L 1/08 370/486 |
| 2006/0039346 A1* | 2/2006 | Shapiro | .................... | H04L 47/10 370/349 |
| 2008/0069018 A1* | 3/2008 | Gast | ...................... | H04W 28/18 370/310 |
| 2008/0155087 A1* | 6/2008 | Blouin | ................ | H04L 43/0817 709/223 |
| 2009/0225762 A1* | 9/2009 | Davidson | ............ | H04L 12/4675 370/401 |
| 2010/0195503 A1* | 8/2010 | Raleigh | ............... | H04L 41/0806 370/235 |
| 2011/0069685 A1* | 3/2011 | Tofighbakhsh | ..... | H04L 41/5067 370/338 |
| 2013/0194919 A1* | 8/2013 | Garavaglia | ....... | H04W 28/0268 370/229 |
| 2013/0219048 A1* | 8/2013 | Arvidsson | ........... | H04L 41/5025 709/224 |
| 2014/0119195 A1* | 5/2014 | Tofighbakhsh | ... | H04W 52/0251 370/241 |
| 2014/0140213 A1* | 5/2014 | Raleigh | ............... | H04L 67/2804 370/235 |
| 2014/0229210 A1 | 8/2014 | Sharifian et al. | | |
| 2015/0085664 A1* | 3/2015 | Sachdev | ............ | H04L 41/5019 370/236 |
| 2016/0014187 A1 | 1/2016 | Cao et al. | | |
| 2016/0277240 A1* | 9/2016 | Sun | ........................ | H04W 4/005 |
| 2016/0315808 A1* | 10/2016 | Saavedra | ................ | H04L 47/24 |

OTHER PUBLICATIONS

Govind, Nirmal, "Optimizing the Netflix Streaming Experience with Data Science", The Netflix Tech Blog, avaialble at http://techblog.netflix.com/2014/06/optimizing-netflix-streaming-experience.html, Jun. 11, 2014.
ISO/IEC "Information technology—Dynamic adaptive streaming over HTTP (DASH)—Part 1: Media Presentation description and segment formats", pp. 1-152, 2nd Edition, May 15, 2014.
Lott, Matthais, "Evolution of Mobile Communication", DOCOMO Euro Labs, VDE/ITG Workshop on "Mobile Communication", May 21-22, 2014.
Telecommunication Standardization Sector of ITU "Methods for Subjective Determination of Transmission Quality", pp. 1-37, Aug. 1996.
Wikipedia, "Mean Opinion Score", Available at <https://en.wikipedia.org/w/index.php?title=Mean_opinion_score&oldid=627638924>, Sep. 30, 2014.

* cited by examiner

METHOD AND DEVICE FOR REQUESTING A QUALITY OF EXPERIENCE IN A COMMUNICATIONS NETWORK

CROSS REFERENCE TO RELATED APPLICATIONS

This application claims the benefit of priority from U.S. Provisional Patent Application No. 62/062,654 entitled "Method and Device for Negotiating Quality of Experience for a Wireless Network Application" filed Oct. 10, 2014, the contents of which are incorporated herein by reference.

TECHNICAL FIELD

The present disclosure relates to digital communications and more specifically, to devices and methods for determining quality of experience and negotiating a quality of service for digital communications.

BACKGROUND

Computer networks may provide communications and services with different quality of service (QoS) levels. The differing levels of QoS may depend on a number of factors, including the available resources in the network, the type of service or application and the content of the transmission. Some service providers make use of differentiated pricing for different QoS levels, which results in users selecting the QoS level that they are willing to accept for the indicated costs. It should be noted, that from a user perspective, an increase in the quality of service does not necessarily increase the quality of the user experience.

SUMMARY

According to embodiments of the present disclosure, there is provided a method of negotiating a quality of service from a communications network for an application in a communications device. The method includes obtaining a quality of experience (QoE) level for an application in a wireless communications device; determining a quality of service (QoS) level corresponding to the QoE level; and requesting service from a communications network for the application at the determined QoS.

According to embodiments of the present disclosure there is provided a method of correlating QoE and quality of service QoS levels for an application in a wireless communications device. The method includes running the application at a QoS level; receiving input from a user indicative of a perceived performance of the application; determining a quality of experience (QoE) level for the application based on the received input; mapping the QoE level with the QoS level; and storing the mapped QoE and QoS levels.

According to embodiments of the present disclosure there is provided a wireless communications device which includes a memory for storing one or more applications; a user interface; a wireless communications interface; and a processor. The device includes one or more non-transitory computer readable media having computer readable instructions stored thereon for correlating QoE and QoS levels for the applications. The instructions, when executed by the processor, direct the wireless communications device to run one of the one or more applications at a QoS level; receive input from a user indicative of a perceived performance of the application; determine a quality of experience (QoE) level for the application based on the received input; map the QoE level with the QoS level; and store the mapped QoE and QoS levels in the memory.

According to embodiments of the present disclosure, there is provided a method of establishing a connection in a communications network for provision of a service to a device associated with a user. The method includes determining a set of quality of service (QoS) parameters in accordance with a requested quality of experience (QoE) level and a QoE to QoS map associated with a user; and transmitting a request to establish a connection for provision of a service in accordance with the determined set of QoS parameters.

According to embodiments of the present disclosure, there is provided a method of mapping a quality of experience (QoE) level and a set of quality of service (QoS) parameters. The method includes providing a service for a communications device in accordance with a first set of QoS parameters; receiving a quality of experience (QoE) assessment from a user based on the user's perceived performance of the service; and creating a QoE to QoS map based on the first set of QoS parameters and the received QoE assessment.

According to embodiments of the present disclosure there is provided a communications device. The communications device includes a communications interface; a processor; and a memory including one or more non-transitory computer readable media having computer readable instructions stored thereon. The instructions, when executed by the processor direct the communications device to: determine a set of quality of service (QoS) parameters in accordance with a requested quality of experience (QoE) level and a QoE to QoS map associated with a user; and transmit a request to establish a connection for provision of a service in accordance with the determined set of QoS parameters.

In some embodiments of the methods, network nodes and user devices described herein, the QoE-QoS map information and the determination of a set of QoS parameters associated with a requested QoE level may include a consideration of the user and the application as well as the categories of content supported by an application; the device and the context or environment in which the device operates; or default QoE-QoS map information for an application which may be provided by an application developer or which may be generated based on a test user group.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

The present disclosure describes systems, devices and methods for incorporating a quality of experience (QoE) assessment into requests or negotiations for a particular quality of service (QoS) in a communications network. The systems, devices and methods may allow a network to provide service with a particular set of QoS parameters in order to meet a user's requested QoE level, or for a user to select a particular QoE level depending on costs associated with the corresponding QoS available from the network. Functionality to determine the correlation between a user's QoE and QoS parameters may be implemented in a user's electronic communications device, in a network node, or in a combination of the two. In one embodiment, a separate device is provided for use in determining the user's QoE levels and corresponding sets of QoS parameters for various services or applications.

In order to configure and support different qualities of service for network services, various QoS parameters may be used to measure, communicate and maintain a required or expected level of quality for a particular application. Such QoS parameters may include, but are not limited to, data rate, jitter, delay, packet loss, error rates, throughput, availability, data priority, echo, and signal-to-noise ratio. The QoS parameters may include vendor or application specific parameters used to measure or define services in a communications network. Different services or applications may have different QoS requirements such that certain parameters or aspects of the service must be maintained at a higher quality levels whereas other parameters are less important. For example, a service flow supporting a voice application may have stricter requirements in terms of jitter and delay. Other service flows, such as a service flow supporting a video application, may have stricter requirements in terms of throughput.

When a connection is requested for a particular service or application data flow, a predetermined QoS may be expected or required in order to support the service or application. Whether a request or call is admitted to the network may depend, among other factors, on the available resources in the network and its ability to reserve or use resources to achieve the expected or required service quality. Different service qualities also may be available at different costs and thus may be negotiated based on a minimum QoS level to support an application, a preferred QoS level, acceptable costs, or a combination of these and other factors. The quality of a wireless channel varies for many reasons, such as the movement of the wireless user device and interference from other transmissions. As result, the network may not be able to provide or guarantee a fixed value for each QoS parameter. Thus, a wireless network may be able to only guarantee certain QoS parameter values subject to a certain amount of variation or subject to a range of QoS values. In the present application, references to a QoS parameter will be understood to include references to a fixed value for the parameter, or to a range of values which may include channel variation statistics for the parameter.

QoE refers to a user's satisfaction with the services received. This is a subjective evaluation of the experience and it may be inherently associated with the communications device through which the service was received. The QoE may be associated with, but is distinct from the quality of service delivered to the device. The services, or applications supported by those services, may cover different functionality and types of data formats, such as voice services, video services, messaging, mail or voice mail services, web browsing or other services or applications where data is transmitted to and received from a communications network. QoE may vary depending on a number of factors including but not limited to a user's subjective expectations; content quality; nature or category of the content, such as a video including sports, news, or movies, or other categories of content; the user's environment, such as while moving or in a noisy or quiet location; and the user's device. Depending on the user's device, and the components or software in the device, errors may be more pronounced or may be masked. For example, a more advanced or expensive video player may improve the quality of a video viewed by a user on the device. The user may have a high QoE level for the video application even though a low QoS may have been received from the network for the video service or application. Thus, different impairments or levels of service from the communications network may have different impacts on a user's QoE. Costs may also factor into a user's QoE because when a service cost for a particular QoS is high, the user may have a higher expectation for the quality of experience at that QoS/price point.

Described herein, and illustrated in FIGS. 1-7, are methods and devices for determining a user's subjective QoE assessment for services received from a communications network and mapping the QoE assessment to the set of QoS parameters under which the service is provided. The mapping of user's QoE assessment to QoS parameters may be specific to a particular service or application, specific to the user's device, or specific to a combination of the service or application and the user's device. It should also be understood that the mapping may be user specific. The user's QoE assessment to QoS mapping may be specific to other factors or elements as described herein. A QoE assessment may be received for the subsequent use of the service or application. When connection is requested from the network to support a service or application for the user device, a desired or requested QoE level may be received for the service or application. Based on the requested QoE level and the QoE to QoS mapping associated with the user, a set of QoS parameters may be determined. A request to establish a connection for provision of the services may be transmitted in accordance with the determined set of QoS parameters. Although discussed above as being specific to a user, a QoE to QoS mapping may be developed to take into account the feedback of a sufficiently large number of users that it may be considered as generic to a set of users.

Figure 1:
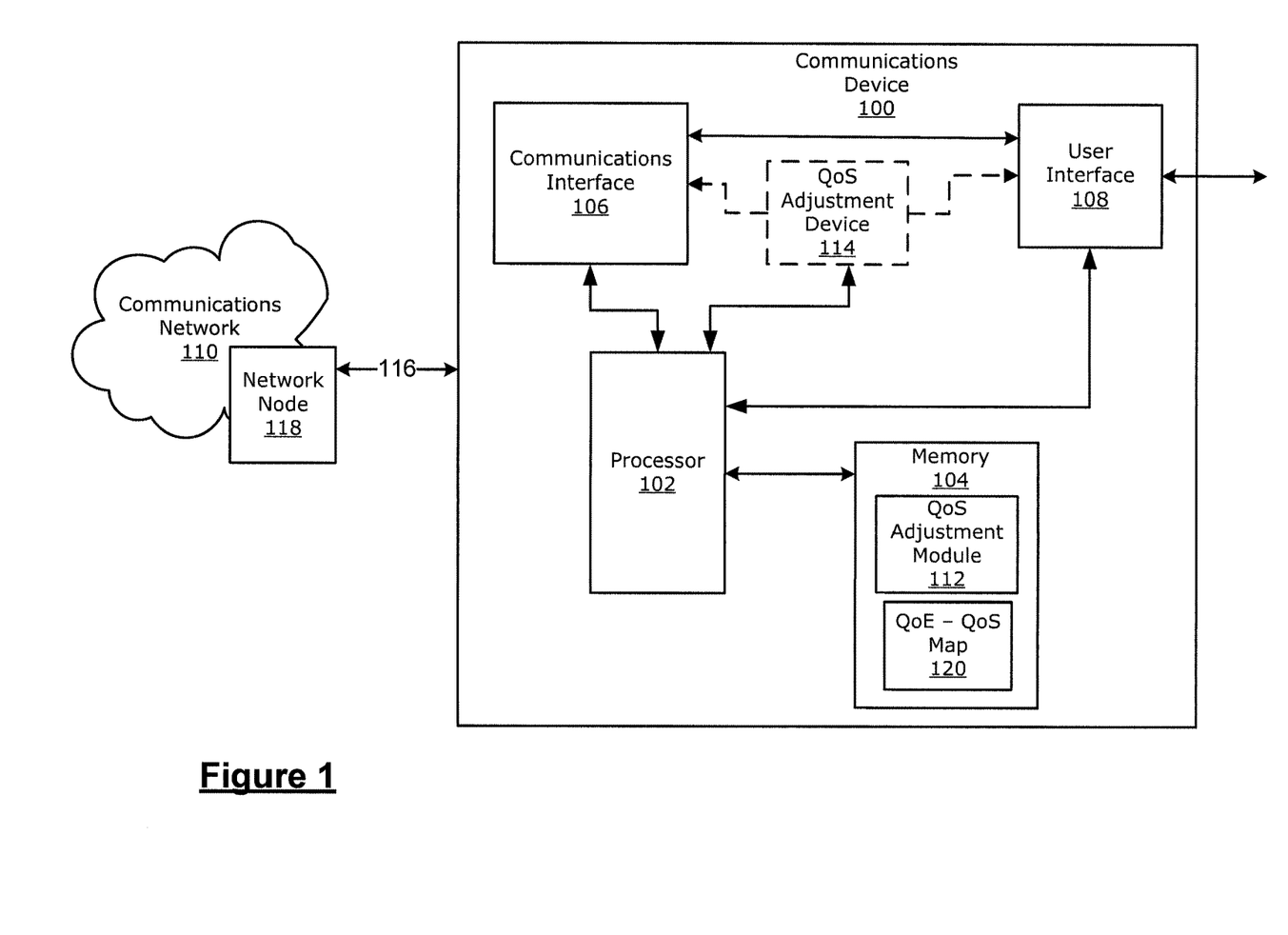
FIG. 1 is a block diagram illustrating a communications device in accordance with one implementation of the present disclosure.

FIG. 1 illustrates a block diagram of one embodiment of the present disclosure that includes a communications device 100 to determine and map a QoE assessment or value indicated by a user to a set of QoS parameters for a service or application. This mapping allows either the device 100 or another entity to request a connection for provision of the service or application with a specified set of QoS parameters determined in accordance with a desired QoE level. The communications device 100 may include a processor 102, a memory 104, a communications interface 106 for sending and receiving data over a communications network 110, and a user interface 108, which components may or may not be arranged as shown in FIG. 1. The user interface 108 may include a display, audio input and output, and buttons, keypads, microphones or other inputs for receiving an input from a user. The memory 104 may store programming and/or instructions for the processor 102 including instructions for implementing a QoS adjustment module 112 as described herein, as well as instructions for implementing various applications as described herein.

The communications network 110 may comprise a wired or wireless communications network or a combination of wired and wireless communications networks. The communications network 110 may operate according to one or more standards or technologies which provide for quality of service control including but not limited to fourth generation (4G) Long-Term Evolution (LTE), Universal Mobile Telecommunications System (UMTS), and other wireless or cellular communications networks. It should be understood that future networks, such as so-called fifth generation (5G) and other next generation network architectures, could also be used for both the access link and the overall network 110, as support of QoS and QoE is likely to be of importance to the development of these networks. In the embodiment of FIG. 1, the communications device 100 uses a wireless channel 116 to access the communications network 110 through a network node 118. Wireless channel 116, and other links inside network 100 can be provided with a QoS guarantee. The network node 118 may be a base station (BS), evolved Node B (eNB), access point (AP) or other network interface.

Figure 2:
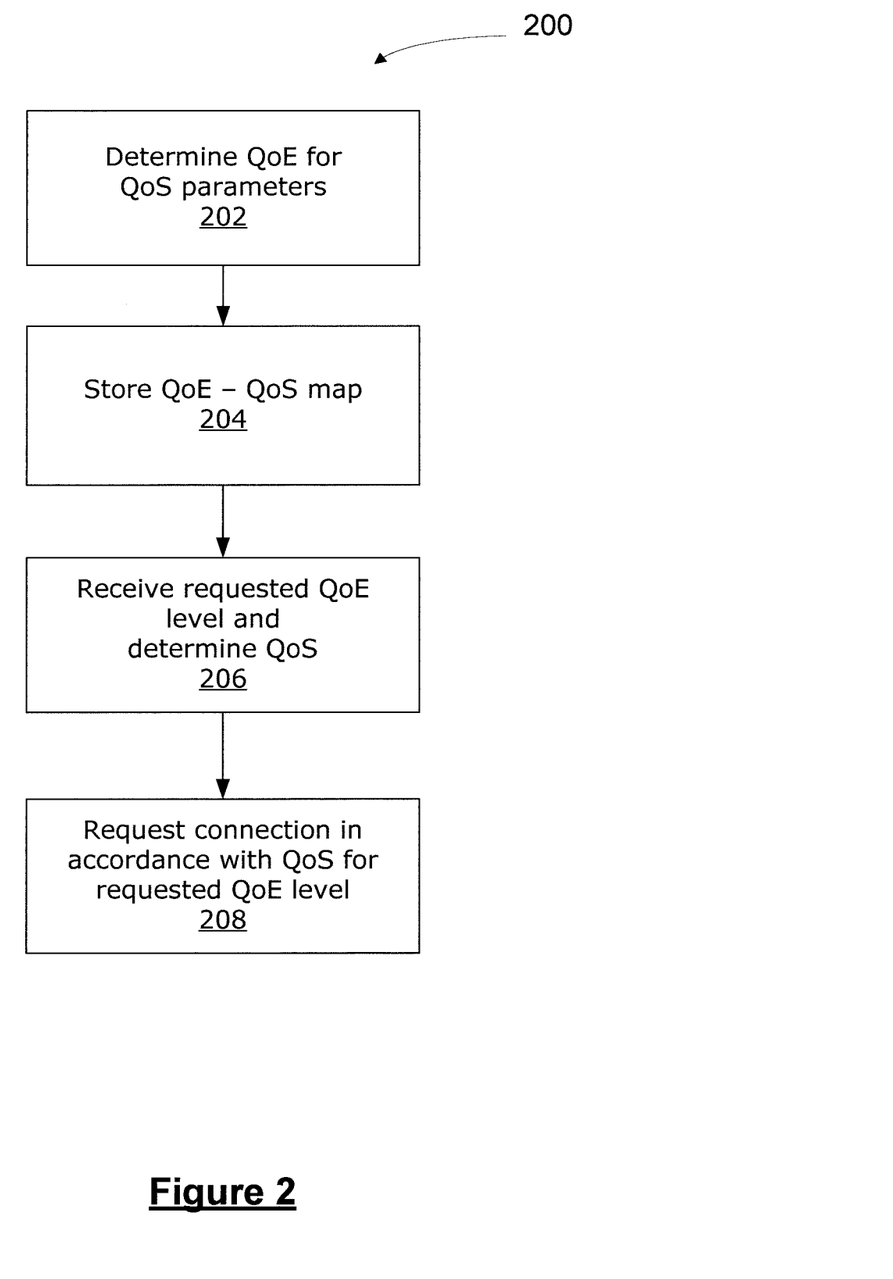
FIG. 2 is a block diagram illustrating a method in accordance with one implementation of the present disclosure.

In one embodiment, as illustrated in FIG. 2, a method 200 is provided that includes determining a user's QoE for one or more services and the set of QoS parameters under which the services are provided by the communications network (Action 202). The determined QoE is mapped to the set of QoS parameters and values or ranges of values for those parameters and the QoE to QoS mapping is stored (Action 204). During subsequent operation of the device 100, a desired QoE may be requested by the device 100, or by a user of the device 100. A set of QoS parameters may be determined based on the requested QoE level and the QoE to QoS mapping (Action 206). Admission to or service from the network 110 may be requested based on the determined set of QoS parameters (Action 208). It will be appreciated that the determined set of QoS parameters may be used for uplink communications, downlink communications, or both uplink and downlink communications.

Figure 3:
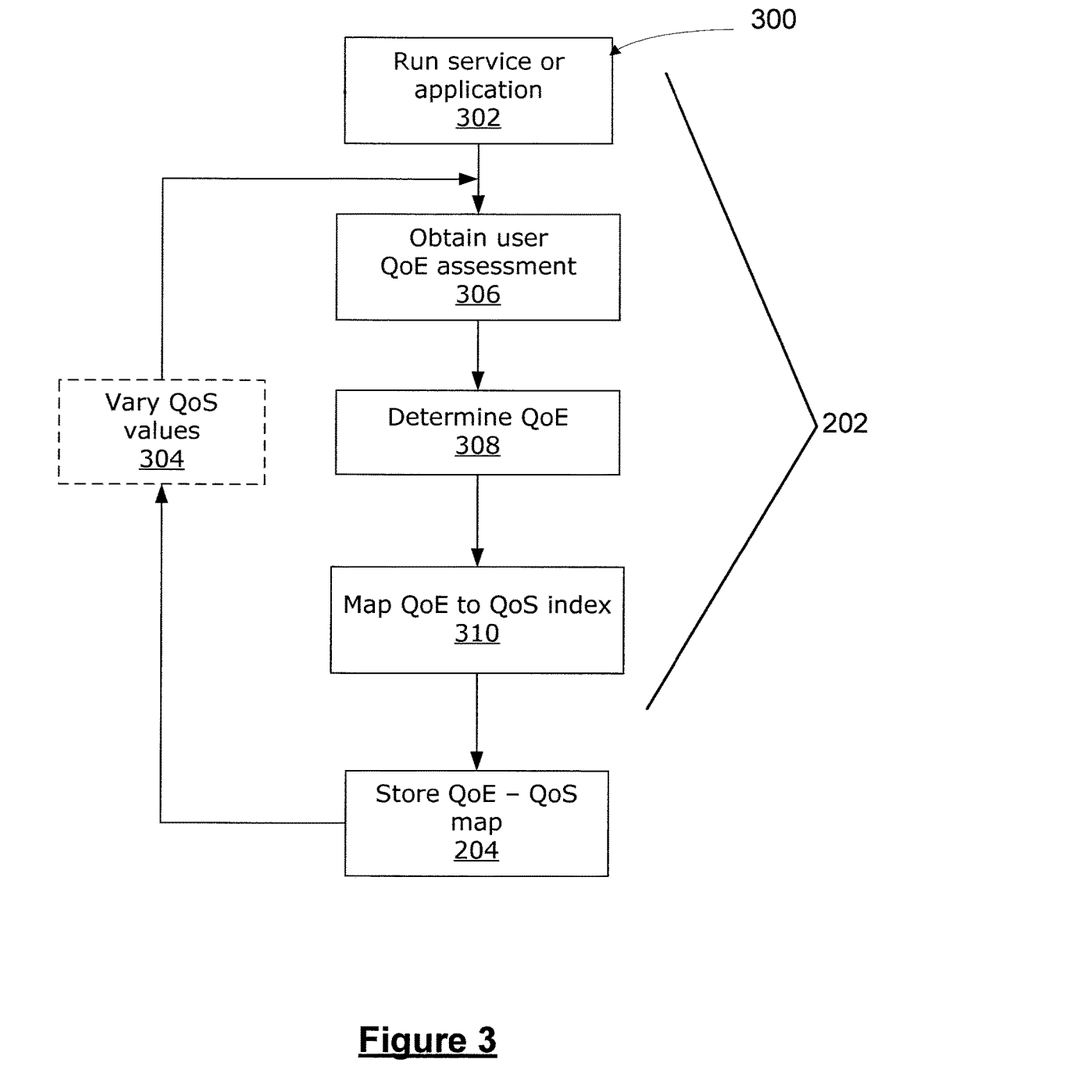
FIG. 3 is a block diagram illustrating a method in accordance with one implementation of the present disclosure.

FIG. 3 illustrates one embodiment of a determining or training phase method 300 for determining the perceived QoE of a service or application and the corresponding QoS parameters. In method 300, a service or application is run on a communications device (Action 302). During use of the application, feedback with an assessment of the QoE is obtained from a user of the device 100 regarding that service or application (Action 306). After obtaining user feedback, a QoE level is determined (Action 308). The determined QoE level is mapped to a set of QoS parameters (Action 310). In one embodiment, values or ranges of values for the tracked QoS parameters are recorded by device 100 over the period that the user feedback was obtained. These ranges can be stored in place of a single fixed value. The mapping of the determined QoE level to the QoS parameters may be stored in memory in the device 100 (Action 204). The stored mappings can be used to allow for a selection of a set of QoS parameters to meet the user's needs without requiring the user to have visibility or any understanding of the QoS parameters. During operation of the device 100, a user can indicate a desired QoE level and the mapping can allow for the specific QoS parameters to be determined and requested. Alternatively, or additionally, the QoE and QoS mapping information for a user may be communicated to and stored in the network 110. In one embodiment, a test application may be run and the values of a set of QoS parameters may be varied or simulated by the device (Action 304). In this embodiment, feedback from a user may be requested during a convenient time to run the test application.

The training phase, as illustrated in FIG. 3, does not need to be an explicit activity. As a user accesses a service, or uses an application, different QoS parameters can be observed and the user can be prompted to provide feedback. This allows the QoE-to-QoS mapping to be built over time. A user may be prompted to provide feedback through the user interface 108 of the device 100 in order for the QoS adjustment module 112 to capture or determine the user's QoE assessment along with current values of the specific QoS parameters which correspond to the QoE. In another embodiment, the device 100 may operate test services or applications, including an online or offline test, vary the values for a set of QoS parameters, and request a user's feedback in order to determine the user's corresponding QoE level under each set of QoS parameters. In an offline test, the QoS parameters for the operation of the service or application under test may be varied by the device 100 in order to simulate different qualities of service. In one embodiment, the QoS adjustment module 112 causes the device 100 to prompt a user for feedback at different times during operation or during a test application, depending on the application and the QoS parameters relevant to the quality of service of that application. In some embodiments, the QoE may be determined for each application as well as for different categories of content handled by the application. For example, for a video application, a different QoE may be associated with different categories of video content such as sports, movies, news or television programs.

The QoS provided for each application running on device 100 may vary based on services available from the network 110 or it may be varied by the device QoS adjustment module 112 in order to solicit the user's feedback and determine the corresponding QoE. In one embodiment, the communications device includes a QoS adjustment device 114 which receives and transmits data in the path between the communications interface 106 and the user interface 108. The QoS adjustment device 114 may be configured and controlled by the QoS adjustment module 112. The QoS adjustment device 114 may be used to vary the quality of service or simulate varying levels of QoS for the training phase, in particular for QoS parameters which may be better varied or simulated at the physical layer.

The feedback provided by a user can be used to create a mapping between a QoE level and a set of QoS parameters that is stored in the memory 104 of the device. Feedback may be requested from a user through user interface 108 in the form of a scaled rating, such as a scale of 1 to 10, or by selection of a descriptive rating. The scaled or descriptive ratings are converted by the device 100 to a QoE level. After receiving sufficient feedback, the QoE levels may be mapped to a set of QoS parameters and values for those parameters required to meet the associated QoE (shown as QoE-QoS map 120 in FIG. 1). As noted above, the mapped QoS values may be fixed values, ranges of values, or base values and an acceptable variation of the base value. As described above, in the QoE-QoS map 120, a set of QoS parameters may be associated with a particular service or application and QoE level, or with a particular service or application, QoE level and category of content.

In one embodiment, each application may be associated with sets of suggested QoS parameters and ranges of values for these parameters which may be used for testing to determine the user's QoE. The suggested QoS parameters may be provided by the application developer. When a new application is created, for example, it may be tested by a test user group. The perceived quality of experience may be determined along with the sets of QoS parameters and values for those parameters which provide different QoE levels for the test user group. The sets of QoS parameters may include a specific list of parameters and minimum or threshold values required to provide a QoE level that would correspond to the application being usable or operable, and a specific list of parameters and minimum or threshold values required to provide a "best" QoE level. A best QoE level may be defined as one where further improvements to the QoS do not improve the common QoE level perceived by a test user. In one embodiment, an application developer may determine the sensitivity of a perceived QoE to variations in each QoS parameter through user group testing. Based on feedback from the testing process, the application developer can determine or specify initial QoS parameters and ranges and values to use during the training phase or method 300. Thus, a new application may be provided with QoS parameters as well as predetermined or default QoE to QoS mappings. Through feedback obtained through the use of the applications, the user may be given the option to modify and further define the QoE to QoS mappings. Additionally or alternatively, the QoE to QoS mapping may be modified based on feedback obtained through testing of the application with the user of the device 100. This information may be stored as described above as part of the QoE-QoS map 120.

In a further embodiment, the QoE to QoS mapping for an application also may be determined for different types of end to end application requirements and end points or receiving devices 100. These additional elements may be considered in particular when determining a QoE level for an application in the device 100 which sends a large amount of uplink traffic. For example, different QoE to QoS mappings may be stored and associated with a video application. If the video content is being sent by the device 100 to the network 110 for rebroadcast, a higher QoE may be requested. If the video content is being sent by the device 100 to the network 110 for a specific Internet channel, a lower QoE may be requested.

Figure 4:
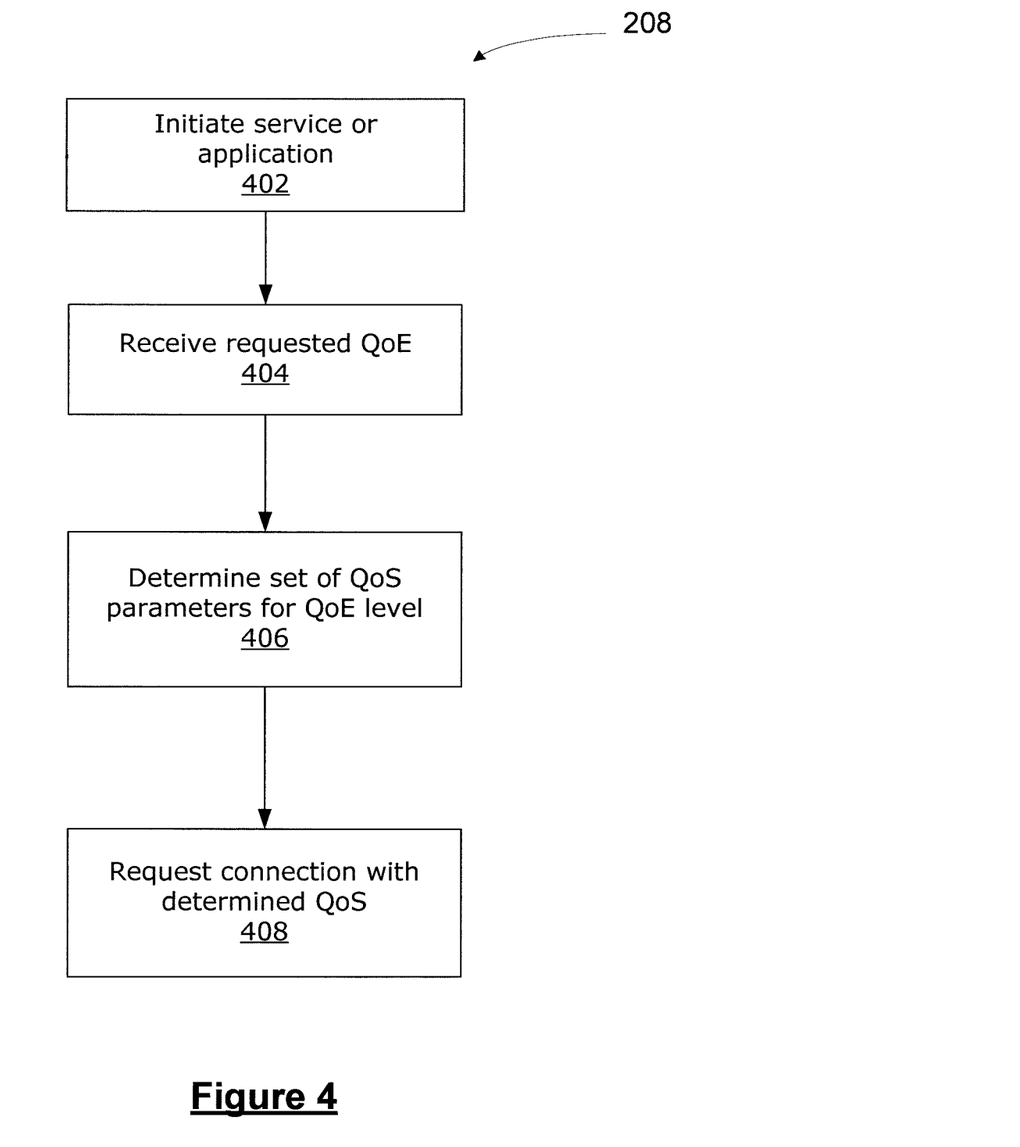
FIG. 4 is a block diagram illustrating a method in accordance with one implementation of the present disclosure.

FIG. 4 illustrates one embodiment of Action 208 in greater detail, which as noted above allows device 100 to specify a set of QoS parameters determined in accordance with a service or an application and a requested QoE level. During operation, the device 100 may initiate a service or an application (Action 402) due to a user request or a request from another application running on the device 100. The desired or requested QoE level is received (Action 404). The requested QoE level may be received from a user of the device 100 in response to a prompt. The requested QoE level may be received through the device 100 determining the QoE level in accordance with default settings for the device 100, the user or the application. Once the requested QoE level is received, the corresponding set of QoS parameters are determined from the QoE to QoS mapping information (Action 406). A request to establish a connection for the provision of the service is sent to the network 110 based on the determined set of QoS parameters (Action 408). Once a request is admitted, the network 110 can provide service to a user at the desired QoE level by satisfying the set of QoS parameters and values for those parameters which are associated with the requested QoE level. In some embodiments, the request to establish a connection based on the determined set of QoS parameters may not include the list of QoS parameters. Instead, the request may include a predetermined QoS profile, level, rating or number which has been associated with the set of QoS parameters from the QoE to QoS map.

In one embodiment, the device 100 is configured to determine and inform the network 110 of the desired or requested QoE level, or the corresponding set of QoS parameters, without input from a user. For example, the requested QoE level may be based on cost settings and quality settings for a device and for a service or application, such as a minimum QoE level configured for the service or application. The cost settings and quality settings may be determined by the device 100 and may be modified by a user. Configured settings may include, for example, a normal or default level of operation, a low cost level of operation, and a priority or emergency level of operation where a high QoE takes precedence over costs. In one embodiment, instructions of the QoS adjustment module 112 for considering cost information and/or selecting a QoE level may be implemented as user agent software operating in the device 100 or in the network 110. The user agent software also may operate to select costs and a QoE based on cost and quality settings provided by a user.

In one embodiment, different information may be presented to a user before or when a user is prompted to select a desired QoE level. In one embodiment, the network 110 communicates to the device 100 information regarding the costs for different sets of QoS parameters based on charging policies and QoS cost assessments determined by the network 110. Cost assessments may be made based on a number of factors including the estimated resource usage for each set of QoS parameters. The communication of cost information to the device 100 may occur periodically, in response to a request for costs, as costs change, or in response to the initiation of the application and request for service. Based on the stored QoE to QoS mapping information, the costs for a set of QoS parameters associated with the desired QoE may be determined and communicated to a user as a set of selectable QoE options. If cost or bandwidth usage for a QoS level is not known, the device 100 may be configured to present a user with QoE options such that the user may select a minimum QoE required to support the application. The corresponding QoS level may be determined from the QoS-QoE map 120 and sent to the network 110.

Figure 5:
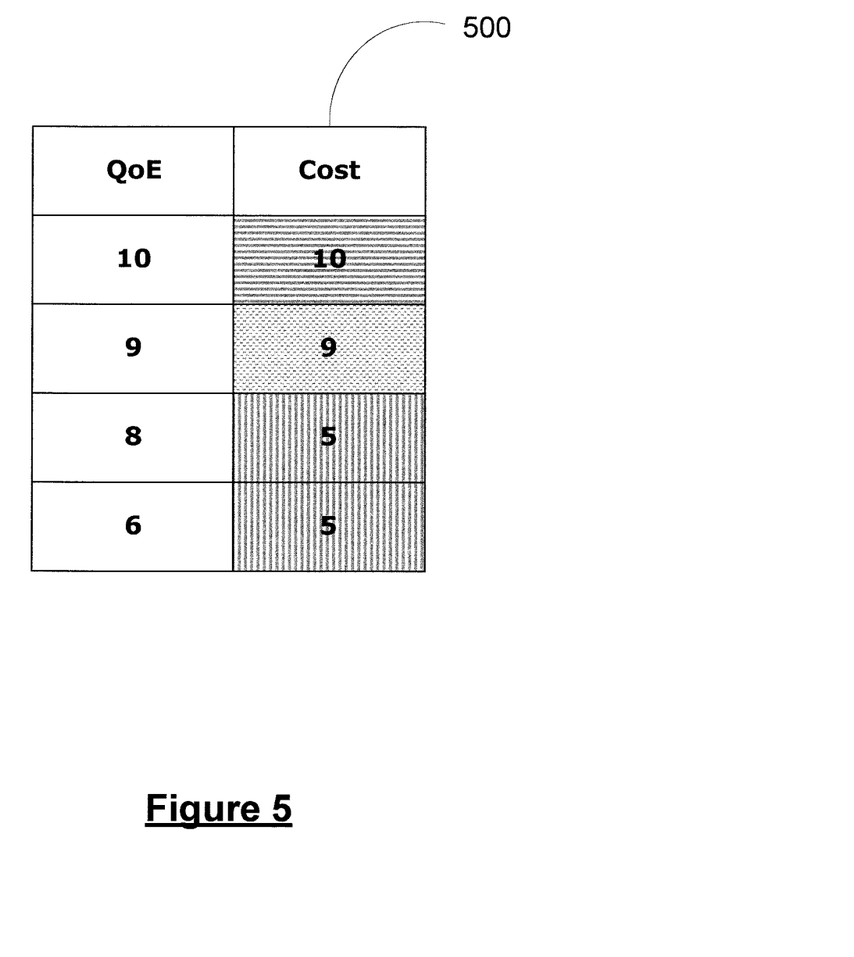
FIG. 5 is a diagram illustrating a sample display in accordance with one implementation of the present disclosure.

FIG. 5 illustrates an example display 500 to a user indicating possible QoE levels and associated costs. The cost of QoE may be displayed on the device 100 while an application is in operation, during the initiation of the application or in response to a change in cost information. In one embodiment, the display of QoE costs is updated dynamically. It will be appreciated that cost and QoE information may be communicated to a user in a number of ways such as relative cost levels, numbers, descriptive terms, relative rates or colours indicating possible QoE levels and associated costs, as illustrated by the patterns in the right hand cost column of FIG. 5. In the example shown, a user may, for example, select a QoE level 8 based on the information provided which shows a large change in cost from "5" for QoE level 8 to a cost of "9" for QoE level 9. Thus, services in the network 110 can be provided to match QoE levels and costs of each level of service.

In other embodiments, the cost and QoE information may be communicated to a user for a particular application and particular categories of content so that a user may select a desired QoE level. For a video application, for example, different cost and QoE information may be available and presented for a sports video or a news videos. A user may be prompted to select the QoE level based on the category of content which will be viewed using the video application.

In a further embodiment, the device 100 may be configured to determine and inform the network 110 of the requested set of QoS parameters based on the associated QoE level as well as associated end-to-end application requirements and/or associated requirements of the device 100 receiving data. As described above, in one embodiment, these requirements and associations with QoE levels and sets of QoS parameters may be provided as default parameters for an application. In a further embodiment, for a device 100 which is transmitting data the set of QoS parameters may be determined based on the received QoE level, the QoE to QoS mapping information and a QoE requirement of a second device 100 which receives data from the transmitting device. Thus, if the second or receiving device 100 is in a noisy environment, the determined set of QoS parameters for the uplink data from the transmitting device 100 may be adjusted accordingly.

In one embodiment, the QoE level for a particular service or application may be changed while the service is being provided or while the application is operating. A new set of QoS parameters may be determined and requested from the network 110 in response to a change in conditions. The QoE level and set of QoS parameters may be changed, for example, in response to an indication from the network of an increase in costs for a particular application. Costs may change depending on a number of factors such as location, user mobility, network demand and load, carrier, or time of day. The QoE level and corresponding set of QoS parameters also may be changed, for example, to decrease rates or resource usage. A decrease may be made if the user, the device and/or the network determines that usage of services is near or above a predetermined threshold or cap for a user's account. Usage of network services can thus be adjusted based on user input or action taken automatically by one or both of the device or network, regardless of the capabilities of a specific application or a specific content provider. The QoE level and corresponding set of QoS parameters requested from the network 110 also may be changed in response to a user request or by the device 100. The user may act independently to save bandwidth or costs without feedback regarding costs from the network 110. Alternatively, a user may act to request an increased QoE level due, for example, to a change in environment or circumstances of the user. For example, when a user moves to an area with very low signal strength, the resource usage may be high or battery consumption may be high. The user may downgrade the QoE level in order to save resources. The device 100 also may be configured to downgrade the QoE level if a battery or power source of the device 100 is low or beyond a particular threshold and less power would be consumed by the lower QoE level.

Changes to the QoE level may be initiated by the user, or by the device 100 in response to changes in sensor data or other inputs or triggers, or a device may prompt a user to change the QoE level in response sensor data or other inputs or triggers. For example, the device 100 may receive information from a vibration sensor (not shown) indicating that the device 100 is vibrating due to movement or road conditions. In that case, a sharp picture may not be necessary for a video application and a lower QoE level could be requested by the device 100.

In one embodiment, the QoE to QoS mapping information may include a QoE level which is associated with multiple sets of QoS parameters. In response to sensor data or other inputs or triggers indicating that a reduction in costs or resources is warranted through a different set of QoS parameters, the least costly set of QoS parameters may be selected to provide the same QoE level. In some embodiments, if a change in the set of QoS parameters is initiated by the network node 118, it also may change the encoding of data sent by the network node 118, and the specified or scheduled encoding for data sent by the device 100, to match the new set of QoS parameters. In one embodiment, the data content of the application is processed or reprocessed to match the set of QoS parameters. In other embodiments, a different version of the application content may be encoded in advance and then selected to match the new set of QoS parameters. For example, where more packet loss is allowed, the content may be modified through different data coding techniques to achieve a particular QoE level for the set of QoS parameters.

In one embodiment, the conditions or context in which a service or application operates also is determined and stored in the memory 104 of the device 100 or network node 118 in association with the sets of QoS parameters and QoE levels. The context may be a set of factors or qualities relating to the device 100, its operation or environment, such as indicated by settings or information stored in the device, sensor data or other inputs or triggers. In one embodiment the context includes an identification of the user operating the device 100 such that different QoE to QoS mapping information may be associated with different users. The context may vary depending on the type of device 100, whether a device 100 and user are in motion, rate of speed, network capabilities, a noisy or poorly-lit user environment etc. For example, the set of QoS parameters and values for an application which are associated with a QoE level of "5" or "satisfactory" in a first context may differ from the QoS parameters and values for associated with the application and a QoE level of "5" or "satisfactory" in a second context. The context information may be stored in association with the QoS-QoE map and a current context may be used, along with the QoE received for the service or application, to determine the associated set of QoS parameters. The context information may be stored and used by the device 100 to determine a set of QoS parameters associated with the received QoE level. In other embodiments, the context information may be communicated to the network node 118 along with the desired QoE level. It will be appreciated that context information may be stored and communicated between the device 100 and the network node 118 in a number of ways. In one embodiment, the context is represented by a context indicator which represents a plurality of predetermined different context information.

Figure 6A:
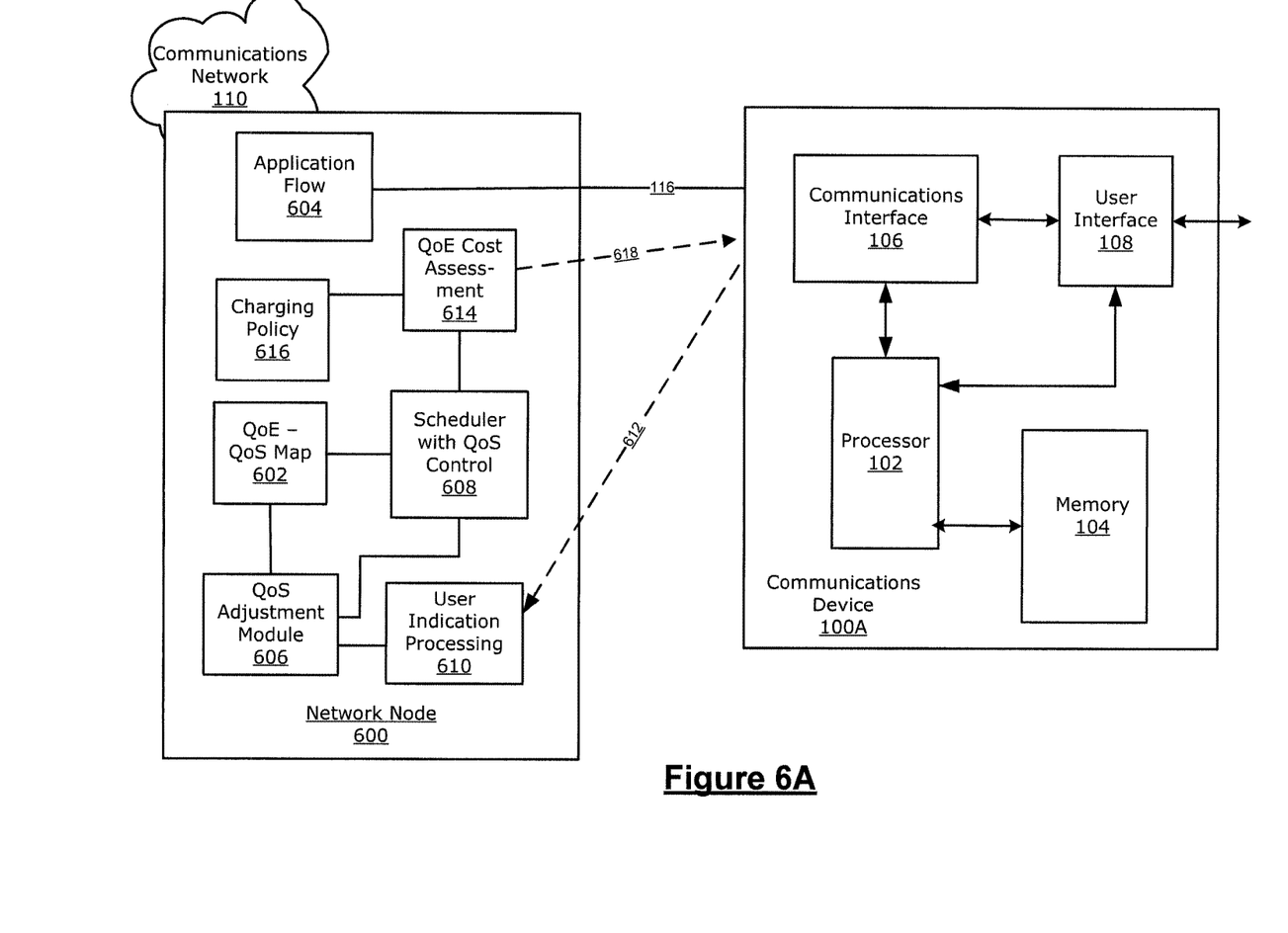
FIG. 6A is a block diagram illustrating a network node and communications device in accordance with one implementation of the present disclosure and FIG. 6B is a block diagram illustrating a method in accordance with one implementation of the present disclosure.

FIG. 6A illustrates a block diagram of a further embodiment according to the present disclosure for a device 100A and system for determining and mapping a user's QoE level to a set of QoS parameters for a service or application. The communications device 100A accesses the communications network 110 through a wireless channel 116 to a network node 600. The network node 600 may comprise a base station (BS), evolved Node B (eNB), access point (AP) or other network interface. In one embodiment of this system, the user communications device 100A may be a standard user device and changes to incorporate the features described herein are provided in the network 110. In other embodiments, the device 100A may include additional software to support the display of QoE and cost information and the selection of a QoE for a service or application.

The network node 600 in FIG. 6A is configured to support the methods illustrated in FIGS. 2, 3 and 4 to determine a user's QoE level for different services or applications. The QoE to QoS map information 602 may be stored in the network, such as in a memory of the network node 600. The network node 600 also may be configured to receive a QoE level from the device, determine a corresponding set of QoS parameters and values required to meet the QoE level, and request and provide service for the application in accordance with the set of QoS parameters.

As illustrated in FIG. 6A, the network node 600 includes an application flow 604 to deliver services to one or more devices 100A for various applications as described above. The node 600 includes a QoS adjustment module 606 configured to adjust the values of QoS parameters for the service or application during a phase to determine a user's QoE level for different sets of QoS parameters. The QoS parameters may be adjusted by the network node 600 through a scheduler 608 which operates with QoS control. The network node 600 may send requests to the communications device 100A for a user to provide feedback as described above. Feedback or user indications 612 from device 100A are received at node 600 and processed at a user indication processing module 610. The user indications are processed as described above, to determine a QoE level and corresponding sets of QoS parameters and values or ranges of values for those parameters required to meet the associated QoE. The QoE-QoS mapping information may be stored in memory in the network node 600 for use during regular services and operation of the device 100A. In further embodiments, the QoE level may be determined and the QoE-QoS mapping information may be stored in association with other parameters such as the application content, or a path or end point associated with the application, as described above.

In this embodiment, the device 100A and network 110 operate to allow a device 100A to negotiate a particular QoE for an application. In this embodiment, with the QoE to QoS mapping information 602 stored in the network node 600, the scheduler 608 provides resource usage estimates to a QoE cost assessment module 614 implemented on node 600. The QoE cost assessment module 614 determines a cost or relative cost associated with each QoS level based on charging policies 616 and other factors stored at node 600. QoE cost information 618 may be transmitted to the communications device 100A in order to be provided to a user, such as in the format shown in FIG. 5, for example. User input (or in some examples, a determination by the device 100A) can generate a request for a particular QoE level for a service or application, or a change of QoE for an application in use, and transmit this information to the network node 600. Based on the requested QoE and the QoE to QoS map 602, the scheduler 608 can provide the requested QoS.

Figure 6B:
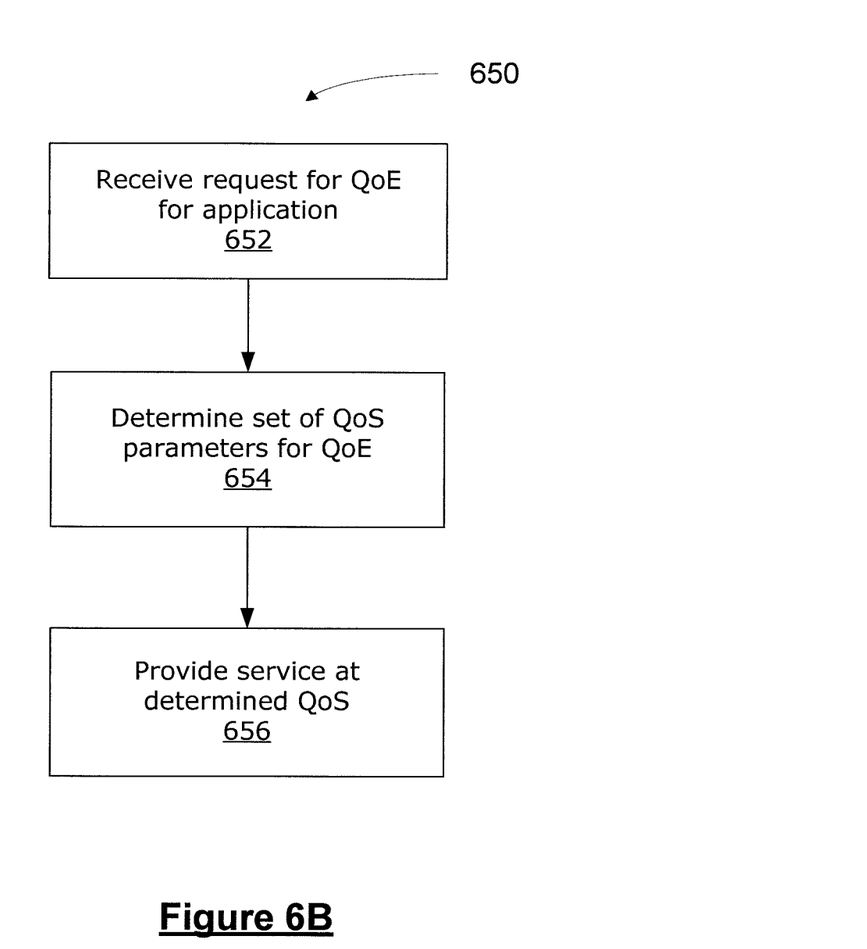

This method 650 is summarized in FIG. 6B and is a variation of Actions 206 and 208, described above. During operation, the network node 118 may receive a request to provide services or support for an application at a particular QoE level (Action 652). The network node 118 determines the set of QoS parameters associated with the requested QoE level (Action 654). The associated set of QoS parameters may be determined based on the QoE to QoS mapping information 602 stored in the network node 118. The network node 118 then requests and provides service for the application and device 100 in accordance with the set of QoS parameters (Action 656). Thus, once a request is admitted and a connection is established, the network 110 can provide service to a user at the desired QoE level by satisfying the QoS parameters and requirements associated with the QoE level.

It should be noted that in step 654, it is possible that the specified QoE level will map to a plurality of different QoS parameter sets. The selection of one of the plurality of parameter sets can be done in accordance with a variety of different network planning functions. Traffic Engineering controllers, Software Defined Networking Controllers and other network entities can all have input into the decision. In one embodiment, a set of QoS parameters is selected to minimize the cost to the user. In another embodiment, the impact of each of the QoS parameter sets to the existing (and projected) traffic flows is considered in selecting a set of QoS parameters.

As described above, during or after completion of service for the application, the network node 600 may receive data from the device 100 indicative of a user's perceived performance of the application. The network node 600 may further update the correlations between QoE levels and sets of QoS parameters in the QoE to QoS map 602 based on the received information.

Figure 7:
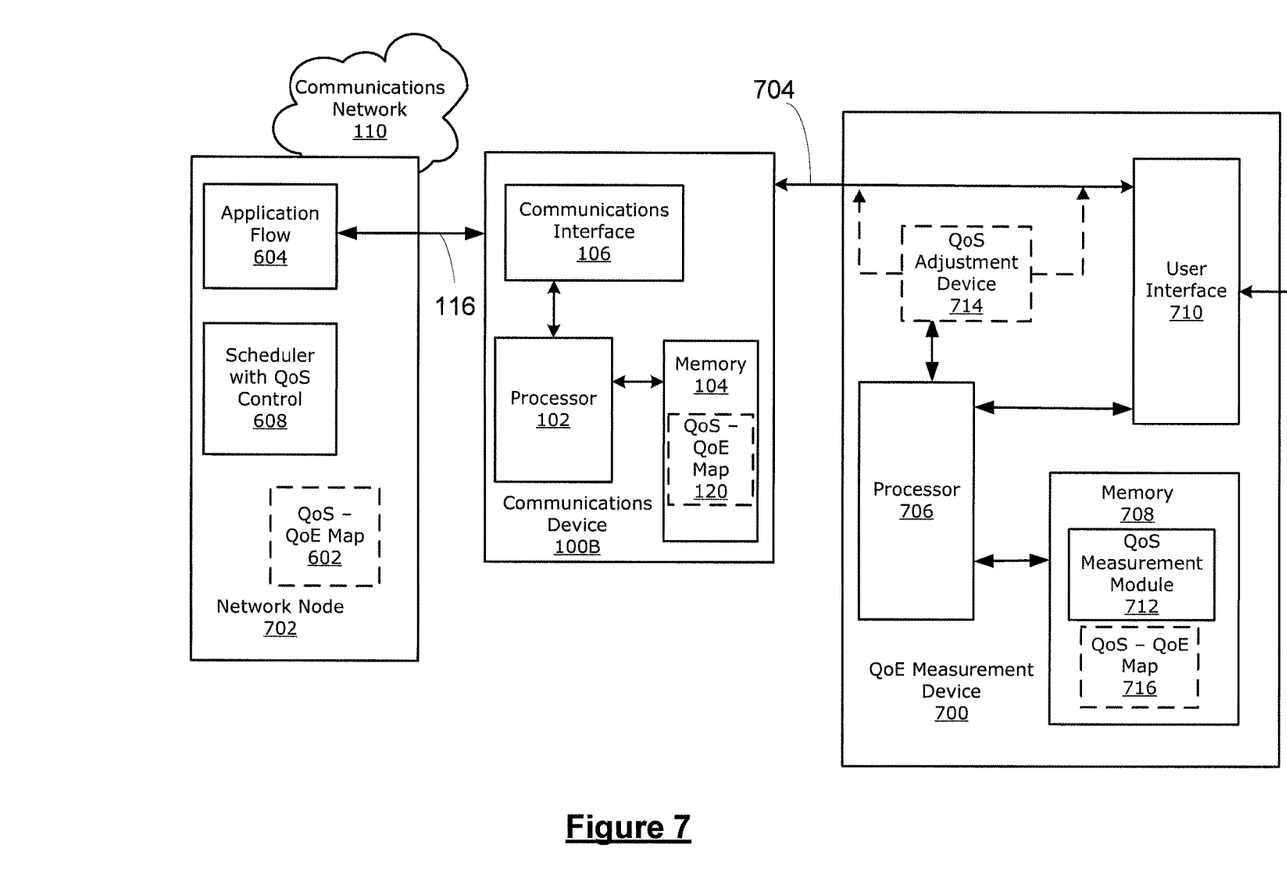
FIG. 7 is a block diagram illustrating a device and a communications system in accordance with one implementation of the present disclosure.

FIG. 7 illustrates a further embodiment of the present disclosure that includes a QoE measurement device 700 for use in determining a QoE level and QoE to QoS mapping information. The QoE measurement device 700 is configured to vary the QoS received by a user for a service or application on the user communications device 100B. The user communications device 100B is connected through a network node 702 to the network 110. The QoE measurement device 700 may be discrete from user communications device 100B and may be used in a communications path 704 between the communications device 100B and a user. In one embodiment, the QoE measurement device 700 receives a modified or an intermediate signal from the communications device 100B, such as a signal between layer 3 and higher, in order to change the QoS and feed the signal to the next layer. In this example, a downlink layer 3 signal may be processed and sent to the higher layer, while in the uplink, a higher layer signal may be processed and sent to layer 3. For some applications, such as audio or video applications, an unmodified signal may be provided to the QoE measurement device 700 in order to present the audio or video to the user and obtain feedback.

The QoE measurement device 700 includes a processor 706, memory 708, and a user interface 710, which components may or may not be arranged as shown in FIG. 7. The user interface 710 may include a display, audio input and output, and buttons, keypads, microphones or other inputs for receiving a command from a user. The memory 708 may store programming and/or instructions for the processor including instructions for a QoS measurement module 712 as described herein. The QoE measurement device 700 may be used to assist with determining a QoE level for a particular application and sets of QoS parameters, as described above. In this embodiment, when the communications system delivers the highest QoS required for an application, the QoE measurement device 700 operates to filter data and send varying levels of downgraded signals to a user through user interface 710. Each application may be associated in memory 708 with suggested sets of QoS parameters and ranges of values which may be used by QoE measurement device 700 for testing the application. The QoE measurement device 700 may include a QoS adjustment device 714. Similar to the above description in respect of QoS adjustment device 114, the QoS adjustment device 714 may be configured and controlled by the QoS measurement module 712 to vary the quality of service, in particular for service characteristics which may be better varied or simulated at the physical layer. It should be noted that FIG. 7 illustrates a logical representation of the QoE measurement device 700. In some embodiments, the QoE Management Device 700 may be integrated into communications device 100B, and may make use of the processor, memory and user interfaces of the communications device.

The QoE measurement device 700 receives input from a user representing the user's feedback regarding the quality of experience as described above. The QoS measurement module 712 may cause the device 700 to prompt a user for feedback at different times, depending on the application and the QoS parameters relevant to the quality of service of that application. The feedback provided by a user is processed and stored as described above to create a map 716 of QoE levels to sets of QoS parameters and values. In one embodiment, the QoE measurement device 700 (without the QoS adjustment device) is provided as a software application which may provided to the communications device 100B and used for determining QoE levels corresponding to QoS levels. Once determined, the QoE-QoS mapping information may be transmitted to the network 110 for storage at node 702 for use by scheduler 608 during operation of the device as described above in respect of FIG. 6A.

In a further embodiment, QoE to QoS mapping information may be stored in the network node 118, 600, 702 based on the correlations of a user's QoE and sets of QoS parameters for an application which have been determined by the device 100, 100A, 100B or by the network node 118, 600, 702, or by a combination of these devices and nodes. In response to receiving a request to establish a connection for the provision of a service in accordance with a particular set of QoS parameters (corresponding to a QoE level), the network node may provide service using a different set of QoS parameters. The network node may select the different set of QoS parameters based on the stored QoE-QoS mapping information indicating that the same QoE level may be correlated or provided with a different set of QoS parameters. For example, the different set of QoS parameters may be selected to reduce the networks resources and/or costs involved in providing service for the application at the same QoE level. Similarly, where the network node receives a request for service for an application at a requested QoE level, and where multiple sets of QoS parameters are mapped to the requested QoE level, the network node may determine the associated set of QoS parameters based on factors such as cost or resource usage in the network.

It will be appreciated that other combinations of network and device technology may be configured to implement the functions described above, including, for example, the communications device determining the QoS and QoE mapping and providing this information to the network to store and use during operations of the device. Alternatively, the QoS and QoE mapping may be determined by the network and stored in and used by the communications device.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a removable hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of establishing a connection in a communications network for provision of a service to a device associated with a user, the method comprising:
   determining a first set of quality of service (QoS) parameters in accordance with a requested first quality of experience (QoE) level and a QoE to QoS map associated with a user, the QoE to QoS map including at least a mapping between the first QoE and the first set of QoS parameters, and at least another mapping between a second QoE and a second set of QoS parameters;
   establishing a connection for provision of a service in accordance with the determined first set of QoS parameters;
   after receipt of a trigger to change the requested first QoE level to the second QoE level, determining, using the QoE to QoS map, the second set of QoS parameters in order to meet the second QoE level; and
   modifying the connection between the device and the communications network for provision of the service in accordance with the second set of QoS parameters.

2. The method of claim 1 wherein the QoE to QoS map is associated with both the user and the device.

3. The method of claim 1 wherein the service supports an application and wherein the QoE to QoS map is further associated with the application.

4. The method of claim 3 wherein the first QoE level is determined based on quality settings associated with the application.

5. The method of claim 3 further comprising:
   receiving cost indications associated with multiple sets of QoS parameters available in the network;
   determining one or more available QoE levels in accordance with the available sets of QoS parameters and the QoE to QoS map; and
   determining the first QoE level based on the available QoE levels and the cost indications associated with multiple sets of QoS parameters and cost settings and quality settings associated with the application.

6. The method of claim 3, further comprising:
after provision of the service in accordance with the second set of QoS parameters, receiving data indicative of the user's perceived QoE for the application; and
updating the QoE to QoS map for the application based on the received data.

7. The method of claim 1 wherein the trigger to change the first QoE level to the second QoE level is received as input from the user.

8. The method of claim 7, further comprising, prior to receipt of the trigger:
receiving cost indications associated with multiple sets of QoS parameters available in the network;
determining one or more available QoE levels in accordance with the multiple sets of QoS parameters and the QoE to QoS map; and
providing the one or more available QoE levels and associated cost indications for presentation to the user.

9. The method of claim 1 further comprising receiving the service from the communications network in accordance with a third set of QoS parameters selected by the communications network, wherein the second set of QoS parameters and the third set of QoS parameters are mapped to the same second QoE level.

10. The method of claim 1 wherein determining the first set of QoS parameters in accordance with the first QoE level and the QoE to QoS map comprises determining a set of QoS parameters having a minimum cost indication.

11. The method of claim 1 further comprising receiving a context indicator indicative of an environment of the device, and wherein determining the first set of QoS parameters comprises determining the first set of QoS parameters in accordance with the first QoE level, the QoE to QoS map and the received context indicator.

12. The method of claim 1 further comprising determining a fourth set of QoS parameters in accordance with a fourth QoE level and a second QoE to QoS map associated with a second user, the second user being associated with a second device which receives data from the device.

13. A method of mapping a quality of experience (QoE) level and a set of quality of service (QoS) parameters, the method comprising:
providing a service for a communications device in accordance with a first set of QoS parameters;
receiving a first quality of experience (QoE) assessment indicative of a user's perceived performance of the service provided using the first set of QoS parameters;
creating a QoE to QoS map to map the first set of QoS parameters to a first QoE level, based on the first set of QoS parameters and the first QoE assessment;
storing the QoE to QoS map in a location accessible to at least one of a device associated with the user or a network node;
varying one or more values of the first set of QoS parameters to obtain a second set of QoS parameters;
providing the service for the communications device in accordance with the second set of QoS parameters;
receiving a second QoE assessment indicative of the user's perceived performance of the service provided using the second set of QoS parameters; and
updating the stored QoE to QoS map to map the second set of QoS parameters to a second QoE level, based on the second QoE assessment and the second set of QoS parameters.

14. The method of claim 13 wherein the service supports an application and wherein the QoE to QoS map is further associated with the application.

15. The method of claim 14 further comprising receiving a respective QoE assessment from the user for each of one or more different categories of content supported by the application, and creating the QoE to QoS map based on the first set of QoS parameters, the respective QoE assessments, and the corresponding one or more different categories of content.

16. The method of claim 14 wherein the first set of QoS parameters is based on a default set of QoS parameters associated with the application, and wherein creating the QoE to QoS map comprises modifying a default QoE to QoS map associated with the application based on the first set of QoS parameters and the first QoE assessment.

17. The method of claim 16 wherein the default QoE to QoS map associated with the application is generated by:
receiving a common QoE level associated with each respective one of a plurality of sets of QoS parameters, the common QoE levels each being based on QoE assessments received from a plurality of users on a plurality of devices, and
storing the common QoE level and associated sets of QoS parameters as the default QoE to QoS map.

18. The method of claim 13 further comprising providing the service in accordance with the first and second sets of QoS parameters in an offline test mode of the device, receiving the first and second QoE assessments for each set of QoS parameters, and creating the QoE to QoS map based on the first and second sets of QoS parameters and corresponding first and second QoE assessments.

19. The method of claim 13 further comprising receiving a respective QoE assessment for each of a plurality of contexts in which the service is provided, and creating the QoE to QoS map based on the first set of QoS parameters, the respective QoE assessment, and each of the plurality of contexts.

20. A communications device comprising:
a communications interface for communicating with a communications network;
a processor; and
a memory including one or more non-transitory computer readable media having computer readable instructions stored thereon, the instructions, when executed by the processor direct the communications device to:
determine a first set of quality of service (QoS) parameters in accordance with a requested first quality of experience (QoE) level and a QoE to QoS map associated with a user, the QoE to QoS map including at least a mapping between the first QoE and the first set of QoS parameters, and at least another mapping between a second QoE and a second set of QoS parameters;
establish a connection for provision a of a service in accordance with the determined first set of QoS parameters;
after receipt of a trigger to change the requested first QoE level to the second QoE level, determine, using the QoE to QoS map, the second set of QoS parameters in order to meet the second QoE level; and
modify the connection between the device and the communications network for provision of the service in accordance with the second set of QoS parameters.

21. The communications device of claim 20 further comprising a user interface, and wherein the instructions, when executed by the processor further direct the communications device to receive cost indications associated with multiple sets of QoS parameters available in a communications network;

determine one or more available QoE levels in accordance with the multiple sets of QoS parameters and the QoE to QoS map;

present the available QoE levels and associated cost indications through the user interface.

22. The communications device of claim 20 further comprising a user interface, and wherein the instructions, when executed by the processor further direct the communications device to provide the service for the device in accordance with the first set of QoS parameters;

receive a QoE assessment through the user interface, the QoE assessment being indicative of the user's perceived performance of the service;

update the QoE to QoS map based on the first set of QoS parameters and the QoE assessment.

* * * * *